United States Patent

Comerci et al.

[11] Patent Number: 5,205,758
[45] Date of Patent: Apr. 27, 1993

[54] COMMUNICATIONS DISTRIBUTION INTERFACE UNIT ASSEMBLY

[75] Inventors: Joseph D. Comerci, Elmhurst; Robert DeRoss, Naperville, both of Ill.; Edward L. Nichols, III, Annapolis; Mark T. Smith, Damascus, both of Md.

[73] Assignee: Molex Incorporated, Lisle, Ill.

[21] Appl. No.: 892,296

[22] Filed: Jun. 2, 1992

[51] Int. Cl.$^5$ .......................................... H01R 13/60
[52] U.S. Cl. .................................. 439/535; 439/540; 439/544
[58] Field of Search ................. 174/66; 439/535, 536, 439/540, 544, 562, 571, 572

[56] References Cited

U.S. PATENT DOCUMENTS

| | | | |
|---|---|---|---|
| 4,303,296 | 12/1981 | Spaulding | 339/122 |
| 4,647,725 | 3/1987 | Dellinger et al. | 439/571 X |
| 4,747,018 | 5/1988 | Munsey et al. | 361/399 |
| 5,064,386 | 11/1991 | Dale et al. | 439/535 |
| 5,117,122 | 5/1992 | Hogarth et al. | 439/540 X |
| 5,133,675 | 7/1992 | Garthwaite et al. | 439/535 |

OTHER PUBLICATIONS

AMP Smart House Brochure Catalogue No. 82743 Dated Mar. 1991—2 pages titled "Distribution Interface Unit".

Primary Examiner—Eugene F. Desmond
Attorney, Agent, or Firm—Stephen Z. Weiss

[57] ABSTRACT

A communications distribution interface unit assembly is mountable to an appropriate frame behind an opening in a wall panel, for instance. A unitary cover is adapted for mounting to the frame and includes a front face, a rear face, and a perimeter wall alignable with the opening in the wall panel. The cover includes integral structural support ribs rigidifying the cover in a direction generally perpendicular to the wall panel. At least one communications module is mountable to the rear of the cover. The module includes at least one connector exposed at the rear of the assembly for easy access thereto. The entire communications module assembly can be preassembled and, thereafter, mounted to the frame behind the opening in the wall panel.

13 Claims, 2 Drawing Sheets

COMMUNICATIONS DISTRIBUTION INTERFACE UNIT ASSEMBLY

FIELD OF THE INVENTION

This invention generally relates to the art of electrical connectors, and, particularly, to a communications or telecommunications distribution interface unit assembly for mounting in a wall or the like.

BACKGROUND OF THE INVENTION

It generally is known to provide communications interface assemblies for mounting in a wall panel to locate electrical connectors or communications modules behind an opening in the wall panel. For instance, a telecommunications outlet mounted in a wall panel may locate a telecommunications module, such as a modular jack. The communications modules or connectors provide terminals for a user's internal wiring for mating with complementary communications plugs inserted through the wall opening into mating interengagement with the modules. The plugs are coupled to communications equipment such as telephones, data processing terminals, video and audio entertainment equipment and the like.

For instance, it has become generally common to use telecommunications wall outlets in ordinary households, with an outlet carrying modular jacks and other connectors upon a support. The modular jacks may be prewired in a production environment to the other connectors. This telecommunications module assembly then is mounted to the wall outlet on site, and the other connectors are coupled to the user's internal wiring, with the outlet mounted behind the opening in the wall panel.

Other communications modules may include other electrical components. For instance, a communications module may comprise a telephone connector sub-assembly, including such connectors as wire trap connectors mounted on a printed circuit board. Another communication module may comprise a coaxial cable splitter sub-assembly.

In all of these schemes of providing communications distribution interface unit assemblies or telecommunications outlets, problems have been encountered in using the interfaces or outlets because they do not provide for easy installation and, after installation, do not provide for easy access to the connector components for carrying-out the internal wiring schemes. Prior interface units most often consisted of numerous separate components which must be assembled in the field. Whenever such miniaturized components must be installed in the field, there is a constant problem of losing and/or misplacing the components. Access to the electrical connectors or the terminals thereof often require removal of the entire assembly in many prior art interface units. Still further, after wires and cables are attached to the electrical components of the assembly, they often must be inserted through openings in the rear of frames, distribution boxes or the like.

This invention is directed to solving the above problems and satisfying a need for an extremely simple communications distribution interface unit assembly which is extremely simple and very easy to install in the field and which provides easy access to the electrical components of the assembly after installation.

SUMMARY OF THE INVENTION

An object, therefore, of the invention is to provide a new and improved, very simple communications distribution interface unit assembly for mounting to frame means behind an opening in a wall panel or the like.

In the exemplary embodiment of the invention, the interface unit assembly includes a unitary cover adapted for mounting to the frame means and including a front face and a rear face. The cover includes integral structure support means extending in a direction generally perpendicular to the wall panel for rigidifying the cover and for aligning the unit assembly with the opening in the wall panel, along with integral fastener receptacle means on the rear face of the cover. At least one communications module, including electrical connector means mounted on a connector support, is provided with means for facilitating fastening the module to the fastener receptacle means of the cover, with the electrical connector means exposed at the rear of the assembly for easy access thereto. Therefore, the entire communications module assembly or distribution unit can be preassembled and, thereafter, mounted to the frame means behind the opening in the wall panel.

The communications modules may be provided in various configurations. As disclosed herein, one module is provided as a telephone connector sub-assembly including wire trap connectors mounted on a printed circuit board. Another communications module is illustrated as a coaxially cable splitter sub-assembly.

In the preferred embodiment of the invention disclosed herein, the unitary cover is integrally molded of dielectric material such as plastic or the like. The integral support means of the cover are provided by integrally molded thin ribs projecting rearwardly from the cover. The integral fastener receptacle means of the cover is provided by integrally molded bosses projecting rearwardly from the cover. Each boss has a cylindrical axially located open portion adapted to receive a complementary externally threaded fastener. The rear edges of the ribs and rear distal ends of the bosses are generally coplanar and define the rear face of the cover.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings in which like reference numerals identify like elements in the figures and in which:

DETAILED DESCRIPTION OF THE PREFERRED EMBODIMENT

Figure 1:
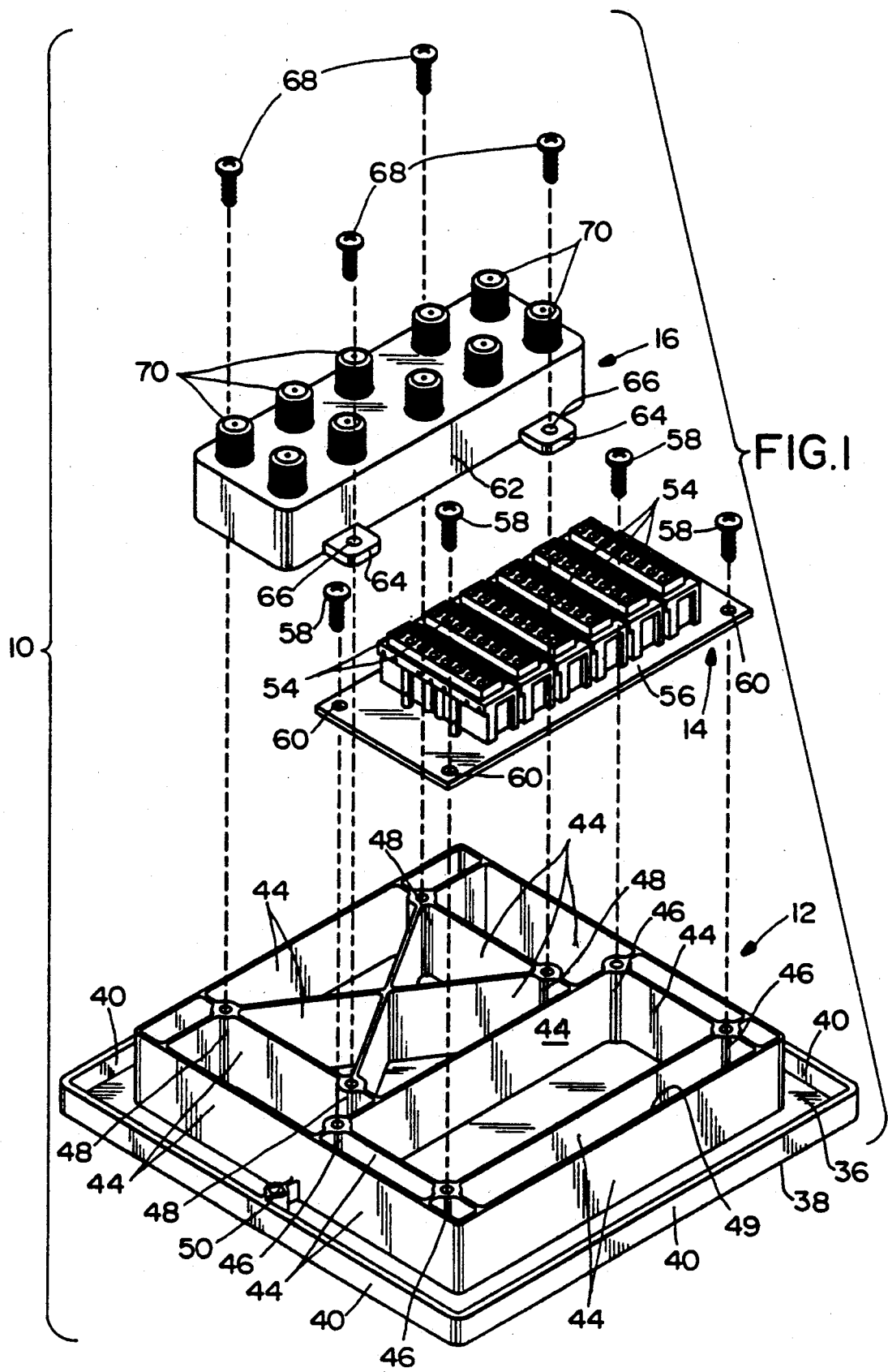
FIG. 1 is an exploded perspective view of a communications distribution interface Unit assembly incorporating the concepts of the invention.

Referring to the drawings in greater detail and first to FIG. 1, the invention is embodied in a communications distribution interface unit assembly, generally designated 10, for mounting to appropriate frame means behind an opening in a wall panel or the like, as described hereinafter. Generally, the interface unit assembly includes a unitary cover, generally designated 12, for mounting to the frame means of the wall panel. At least one communications module is mountable to the rear of cover 12 for easy access thereto. In the drawings, two modules, generally designated 14 and 16, are shown.

Figure 2:
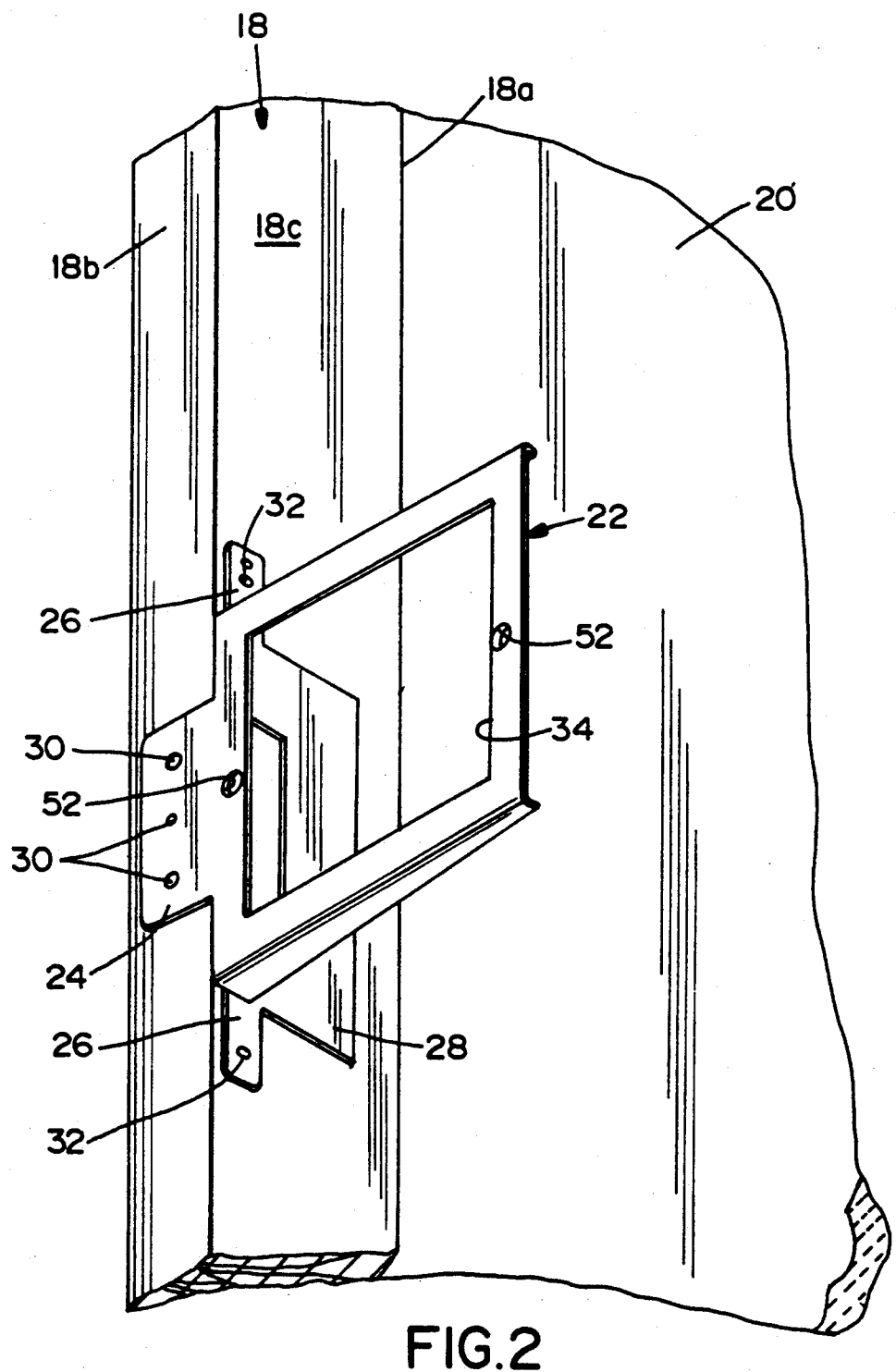
FIG. 2 is a fragmented perspective view of a frame means onto which the distribution interface unit assembly is mountable, specifically showing the frame means as a bracket on a stud in a wall panel construction.

Before proceeding with a detailed description of unitary cover 12 and communications modules 14 and 16, reference is made to FIG. 2 wherein a wall support member, generally designated 18, such as a conventional wall stud, supports a pair of wall panels, such as a rear panel 20 secured to a rear edge 18a of stud 18, and a front panel (not shown) secured to a front edge 18b of the stud. The panels may be conventional drywall panels. A frame means in the form of a bracket, generally designated 22, is secured to front edge 18b and a side wall 18c of the stud by means of a flange 24 and a pair of ears 26 projecting outwardly from another flange 28. Flange 24 includes apertures 30 through which appropriate fasteners can be inserted to secure the bracket to front edge 18b of stud 18, and ears 26 include apertures 32 through which appropriate fasteners can be inserted to secure the bracket to side wall 18c of the stud. The bracket has a rectangularly shaped opening 34 which would be aligned with an opening in the wall panel secured to front edge 18b of stud 18.

From the foregoing description of FIG. 2, it should be understood that bracket 22 mounted to wall stud 18 is considered the "frame means" to which distribution interface unit assembly 10 is mounted by means of cover 12. However, it is to be understood that a myriad of other frame means are contemplated, FIG. 2 being but an example.

Referring back to FIG. 1, unitary cover 12 is integrally molded of dielectric material, such as plastic or the like. The cover includes a generally planar face plate portion 36 defining a front face 38, the face plate being bounded by a peripheral, rearwardly projecting flange 40. The cover includes rearwardly projecting walls 44 some of which are located just within the boundary of flange 40. These perimeter walls 44 help to locate the unit assembly 10 within aperture 34 in bracket 22.

Generally, integral structural support means are provided for rigidifying cover 12 in a direction generally perpendicular to face plate 36 and, consequently, generally perpendicular to an appropriate wall panel as will be apparent hereinafter. Specifically, the integral structural support means are provided in the form of integrally molded thin ribs 44 projecting rearwardly from face plate 36 of the cover.

Generally, integral fastener receptacle means are provided on the cover for receiving fastener means for assembling communication modules 14 and 16 to the rear of the cover. Specifically, the integral fastener receptacle means are provided by integrally molded bosses 46 and 48 projecting rearwardly of face plate 36 generally at various interstices of ribs 44. Each boss has a cylindrical axially located open portion adapted to receive complementary externally threaded fasteners, as described below. It can be seen in FIG. 1 that the rear edges of ribs 44 and the rear distal ends of bosses 46 and 48 are generally coplanar to define a rear face 49 of the cover.

Lastly, cover 12 includes a pair of hollow bosses 50 on opposite sides thereof and through which appropriate fasteners can be inserted into or through holes 52 (FIG. 2) in bracket 22 for mounting the cover (i.e. unit assembly 10) to the frame means provided by the bracket.

Generally, various configurations of communications modules, including electrical connector means, are mountable to the rear of cover 12, whereby access to the connector means of the modules is afforded for complementary mating connectors, along with easy access to the rear of the modules to effect internal wiring thereto.

Specifically, communications module 14 is provided in the form of a telephone connector sub-assembly which includes a plurality of elongated wire trap connectors 54 mounted on a printed circuit board 56. Module 14 is mounted to the rear face of cover 12 by means of threaded fasteners 58 inserted through holes 60 in printed circuit board 56 and then threading the fasteners into internally threaded bosses 46 in the rear of cover 12. When so preassembled, the cover can be mounted to an appropriate frame means (i.e. bracket 22 in FIG. 2). Easy access is afforded to the rear of connectors 54 from the rear of interface module assembly 10 for inserting wires into the connectors for internal wiring purposes. Such access is available by removing the module from the bracket 22 exposing terminals 54 and 70.

Communication module 16 is provided in the form of a coaxial cable splitter sub-assembly which includes a housing 62 having outwardly projecting ears 64. The ears have holes 66 through which threaded fasteners 68 can be inserted. The module or sub-assembly is mounted to the rear of cover 12 by threading fasteners 68 into axially located cylinders bored within bosses 48. Coaxial cable receiving devices 70 project rearwardly of housing 62 of splitter sub-assembly 16 for easy access thereto from the rear of the interface module assembly.

From the foregoing, it can be understood that communications modules 14 and 16 can be preassembled to the rear of cover 12. The entire preassembled interface module assembly 10 then can be mounted as a unit to an appropriate frame means of a panel construction, such as the bracket and panel structure shown in FIG. 2. There are no extraneous or extra components required by a user to mount the entire module assembly in the field. Once mounted, easy access is afforded to the rear of the module for effecting internal wiring to the various connector means or devices of the communications modules.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. A communications distribution interface unit assembly for mounting to appropriate frame means behind an opening in a wall panel, comprising:
a unitary cover adapted for mounting to the frame means and including a front face, a rear face, integral structural support means on said rear face extending in a direction generally perpendicular to the wall panel for rigidifying the cover and for aligning the unit assembly with the opening in the wall panel and integral fastener receptacle means on the rear face of the cover; and at least one communications module, including electrical connector means mounted on a connector support, having means for facilitating fastening the module to the fastener receptacle means of the cover, with the electrical connector means exposed at the rear of the assembly for easy access thereto, whereby the entire communications module assembly can be preassembled and, thereafter, mounted to said frame means behind the opening in the wall panel.

2. The communications interface unit assembly of claim 1 wherein said unitary cover is integrally molded of dielectric material such as plastic.

3. The communications interface unit assembly of claim 2 wherein said integral structural support means of the cover comprise integrally molded thin ribs projecting rearwardly of the cover.

4. The communications interface unit assembly of claim 2 wherein said integral fastener receptacle means of the cover comprise integrally molded bosses projecting rearwardly of the cover.

5. The communications interface unit assembly of claim 2 wherein said bosses have axially located cylindrical open portions for receiving complementary externally threaded fasteners.

6. The communications interface unit assembly of claim 4 wherein said integral structural support means of the cover comprise integrally molded thin ribs projecting rearwardly of the cover.

7. The communications interface unit assembly of claim 6 wherein rear edges of said ribs and rear distal ends of said bosses are generally coplanar and define the rear face of the cover.

8. The communications interface unit assembly of claim 1 wherein said communications module comprises a telephone connector sub-assembly including at least one wire trap connector mounted on a printed circuit board.

9. The communications interface unit assembly of claim 1 wherein said communications module comprises a coaxial cable splitter sub-assembly.

10. A communications distribution interface unit assembly for mounting to appropriate frame means behind an opening in a wall panel, comprising:

a unitary cover integrally molded of dielectric material and adapted for mounting to the frame means, the cover including front face plate means, through aperture, integrally molded thin ribs projecting rearwardly of the face plate means to provide structural support means rigidifying the cover in a direction generally perpendicular to the wall panel and to align the unit assembly with the opening in the wall panel, and integrally molded bosses projecting rearwardly of the face plate means to provide integral fastener receptacle means on the rear of the cover; and at least one communications module, including electrical connector means mounted on a generally planar connector support, having means for facilitating fastening of the module to the bosses of the cover, with the electrical connector means exposed at the rear of the assembly for easy access thereto, whereby the entire communications module assembly can be preassembled and, thereafter, mounted to the frame means behind the opening in the wall panel.

11. The communications interface unit assembly of claim 10 wherein rear edges of said ribs and rear distal ends of said bosses are generally coplanar and define a rear face of the cover against which the generally planar connector support of the communications module is mountable.

12. The communications interface unit assembly of claim 10 wherein said communications module comprises a telephone connector sub-assembly including at least one wire trap connector mounted on a printed circuit board.

13. The communications interface unit assembly of claim 10 wherein said communications module comprises a coaxial cable splitter sub-assembly.

* * * * *